(12) United States Patent
Cong et al.

(10) Patent No.: US 9,535,806 B1
(45) Date of Patent: Jan. 3, 2017

(54) USER-DEFINED STORAGE SYSTEM FAILURE DETECTION AND FAILOVER MANAGEMENT

(71) Applicant: EMC Corporation, Hopkinton, MA (US)

(72) Inventors: Honglei Cong, Shanghai (CN); Uwe Wienand, Dortmund (DE); Yue Qian, Shanghai (CN); Zhou Huang, Shanghai (CN); Mei Zhao, Shanghai (CN); Ning Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 14/672,983

(22) Filed: Mar. 30, 2015

(51) Int. Cl.
*G06F 11/07* (2006.01)
*G06F 11/20* (2006.01)
*G06F 11/14* (2006.01)

(52) U.S. Cl.
CPC ....... *G06F 11/2069* (2013.01); *G06F 11/1435* (2013.01); *G06F 11/1464* (2013.01)

(58) Field of Classification Search
CPC .................. G06F 11/2069; G06F 11/2094
USPC .................................................. 714/6.3, 4.11
See application file for complete search history.

(56) References Cited

U.S. PATENT DOCUMENTS

| 7,734,951 B1 | 6/2010 | Balasubramanian et al. |
| 2005/0149684 A1 | 7/2005 | Sankaran et al. |
| 2011/0200052 A1* | 8/2011 | Mungo ................. H04L 41/028 370/401 |
| 2012/0089863 A1 | 4/2012 | Goto et al. |
| 2012/0136743 A1* | 5/2012 | McQuade .............. G06Q 30/08 705/26.3 |
| 2012/0136802 A1* | 5/2012 | McQuade .......... G06Q 30/0282 705/347 |
| 2014/0223240 A1* | 8/2014 | Patil .................... G06F 11/3034 714/47.1 |

* cited by examiner

*Primary Examiner* — Chae Ko
(74) *Attorney, Agent, or Firm* — BainwoodHuang

(57) ABSTRACT

A storage system failure detection and failover application includes a command execution engine that loads and interprets both user-defined storage system management functions, and vendor-defined storage system management functions. The user-defined storage system management functions allow the system to detect and handle failure conditions indicating both the current state of an active storage system, and the current state of one or more applications that consume a storage service or services provided by the active storage system. The user-defined storage management functions also allow the system to perform failover processing in a way that allows applications to perform application-specific processing during storage system failover.

17 Claims, 5 Drawing Sheets

USER-DEFINED STORAGE SYSTEM FAILURE DETECTION AND FAILOVER MANAGEMENT

BACKGROUND

As it is generally known, various types of storage services can be used to provide external data storage from storage server systems ("storage systems") to other computer systems. For example, Network-Attached Storage (NAS) systems provide file-based storage services over a network. File-based storage services provide external storage in the form of externally stored files, so that the files can be accessed as if they were located on local storage. NAS systems may use various specific protocols to provide file-based storage services, including but not limited to the Network File System (NFS) distributed file system protocol, the Server Message Block (SMB)/Common Internet File System (CIFS) application-layer network protocol, and/or Apple Filing Protocol (AFP).

Block-based storage services provide external storage in the form of blocks served by storage systems from remote disk storage devices. For example, block-based storage services may employ the Internet Small Computer System Interface (iSCSI). iSCSI is an Internet Protocol (IP)-based storage networking standard for linking data storage resources, and allows access to external storage from the storage system as if it were from a locally attached disk. Block-based storage services may also use Fibre Channel (FC) network technology, and/or the Serial Attached SCSI (SAS) protocol or the like in the context of Direct Attached Storage (DAS).

In order to improve the availability of storage services, user data may be replicated across multiple storage systems. In a basic configuration, an active storage system is used to provide one or more storage services, while a duplicate copy of the user data stored on the active storage system is concurrently maintained on one or more backup storage systems. In the event that the active storage system fails, one of the backup systems can seamlessly take over providing the storage services, thus improving continuity of service.

SUMMARY

Previous technologies for detecting storage system failures and managing failovers from an active storage system to a backup storage system have exhibited significant shortcomings. Some storage system vendors provide their own system management tools for detecting storage system failures and managing failovers. These tools typically detect storage system failures either by periodically fetching status information from the active storage system, and/or by requiring the active storage system to periodically report its operational status. Such previous vendor-provided tools decide when a failover is to be performed based on vendor-defined, storage system status information. As a result, previous vender-provided tools can generally only detect vendor-defined failure conditions. Vendor-defined failure conditions involve only storage system-specific failures, such as file system failures, LUN failures, etc. Previous vendor-provided management tools alone cannot detect failure conditions that are based on events occurring outside of the storage systems themselves. This is a significant drawback for users, who may wish to define their own failure conditions for determining when a storage system failover should occur.

Additionally, when previous vendor-provided storage system management tools detected a failure condition, they responded by simply causing a storage system failover, in which a backup storage system begins providing the storage services performed by the previous active storage system, thus making the backup storage system the new active storage system. Such failovers are potentially costly in terms of resources and time, and should be avoided if possible. Previous vendor-provided storage system management tools cannot provide failover processing tailored to meet the specific needs of users, particularly with regard to application-specific failover processing for applications that consume the storage services provided by the storage systems.

A further shortcoming of previous vendor-provided management tools is that they cannot completely process failure conditions that are temporary, and which accordingly do not require an immediate failover of the active storage system to a backup storage system. Moreover, previous vendor provided management tools alone do not provide the ability to cause a failover operation completely in response to failure conditions detected outside the storage systems themselves, under conditions in which the active storage system may not have failed.

To address the above described and other shortcomings of previous technologies, a new system is disclosed for providing user-defined storage system failure detection and failover management. In the disclosed system, a storage system failure detection and failover management application includes a command execution engine that loads, into a memory of a computer (e.g. a server computer), a number of user-defined storage system management functions, and a number of vendor-defined storage system management functions. The user-defined storage system management functions may include storage system management functions, modules, routines or tools designed, configured and/or developed by or on behalf of a customer who has purchased, leased, or otherwise obtained an active storage system and a backup storage system from a storage system vendor. The user-defined storage system management functions are designed, configured and/or developed to operate with the specific applications that are used by the customer. For example, the user-defined storage system management functions may be embodied to include specific failure detection and/or failover processing functions tailored for the needs of the specific applications executing on the computer. Additionally, the user-defined storage system management functions may be designed, developed and/or configured to connect to and communicate with individual ones the applications executing on the computer, e.g. using a secure channel based on the secure shell (SSH) network protocol, a proprietary protocol, or some other mechanism. The user-defined storage system management functions are also operable to monitor storage system state parameters indicating a current state of the active storage system, wherein the storage system state parameters are stored in a set of system environment parameters located in the memory of the computer.

The vendor-defined storage system management functions may consist of or include storage system management functions, modules, routines or tools obtained from the storage system vendor from which the active storage system and/or backup storage system were obtained. For example, the vendor-defined storage system management functions may include functions or routines that are designed and/or developed by the vendor to operate with the active storage system and the backup storage system. The vendor-defined storage system management functions are operable to connect to and communicate with the active storage system and the backup storage system, e.g. using a secure channel based on the secure shell (SSH) network protocol, a proprietary protocol, or some other mechanism. The vendor-defined storage system management functions are further operable to maintain the storage system state parameters by storing a current state of the active storage system into the storage system state parameters.

The active storage system provides at least one storage service to the computer over a network. The external storage provided by the storage service to the computer is consumed by at least one of the customer's applications that execute on the computer. The command execution engine executes the user-defined storage system management functions and the vendor-supplied storage management functions on the computer. By loading and executing both the user-defined storage system management functions and the vendor-defined storage system management functions, the command execution engine enables the user-defined storage system management functions to call the vendor-defined storage system management functions. For example, the command execution engine may be embodied as an interpreter, and include a command line interface that processes commands consisting of lines of text. In such an embodiment, the user-defined storage system management functions and/or the vendor-defined storage system management functions may be provided as scripts of commands that are loaded into the command execution engine.

The command execution engine may be embodied to execute one or more of the user-defined storage system management functions within a first set of execution threads, and one or more of the vendor-defined storage system management functions within a second set of execution threads, in a shared execution context that includes both the user-defined storage system management functions, and the vendor-defined storage system management functions.

The disclosed system detects and processes storage failure conditions responsive to the execution of both user-defined storage system management functions and vendor-defined storage system management functions, in order to provide failure detection and failover management for the active storage system.

In another aspect of the disclosed system, one of the vendor-defined storage system management functions detects a storage failure condition by detecting that the active storage system has failed (e.g. one or more disks in the active storage system have failed). In response to detecting that the active storage system has failed, a second one of the vendor-defined storage system management functions modifies the storage system state parameters to indicate that the active storage system has failed. One of the user-defined storage system management functions then reads the storage system state parameters, and responsive to the storage system state parameters indicating that the active storage system has failed, a second one of the user-defined storage system management functions sends an indication that the active storage system has failed to one of the applications that consumes the external storage provided through the storage service provided by the active storage system.

In response to detecting that the active storage system has failed, a third one of the vendor-defined storage system management function triggers a failover operation causing the backup storage system to replace the active storage system in providing the external storage to the application executing on the computer. The failover operation includes causing the backup storage system to begin providing the storage service from the backup storage system to the computer.

In response to completion of the failover operation, a fourth one of the vendor-defined storage system management functions modifies the storage system state parameters to indicate that the backup storage system is the new active storage system. In response to the storage system state parameters indicating that the backup storage system is the new active storage system, a third one of the user-defined storage system management functions sends an indication to the application that the backup storage system has started providing the storage service to the computer.

In another aspect of the disclosed system, one of the user-defined storage system management functions detects that the application has experienced a storage service failure. One of the vendor-defined storage system management functions checks the operational status of the active storage system, and another one of the vendor-defined storage system management functions modifies the storage system state parameters to indicate that the active storage system has experienced a temporary failure. One of the user-defined storage system management functions then sends, in response to the storage system state parameters indicating that the active storage system has experienced a temporary failure, an indication that the active storage system has experienced a temporary failure to the application. The application may then perform actions to handle the temporary failure, such as queuing storage requests (e.g. writes and/or reads) until the active storage system resumes complete and correct operation.

The vendor-defined storage system management function subsequently re-checks the operational status of the active storage system, and in response to the active storage system indicating that the active storage system has recovered from the temporary failure, modifies the storage system state parameters to indicate that the active storage system has recovered from the temporary failure. In response to the storage system state parameters indicating that the active storage system has recovered from the temporary failure, a third one of the user-defined storage system management functions indicates to the application that the active storage system has recovered from the temporary failure. The application may then resume using the storage service, and may also issue any storage operations that were queued during the temporary failure.

In another aspect of the disclosed system, one of the user-defined storage system management functions detects that the application has experienced a storage-related failure, such as a storage media failure or the like. One of the vendor-defined storage system management functions determines that the active storage system has experienced a permanent failure. A second one of the user-defined storage system management functions sends an indication to the application that the active storage system has permanently failed, so that the application can prepare for the failover operation, e.g. by suspending storage operations (e.g. writes and/or reads) until the backup storage system begins providing the storage service.

In another aspect of the disclosed system, one of the user-defined storage system management functions detects that the application has experienced a critical failure. In response to the user-defined function detecting that the application has experienced a critical failure, one of the vendor-defined storage system management functions triggers, without checking the operational status of the active storage system, a failover operation. The failover operation causes the backup storage system to replace the active storage system in providing the external storage to the application executing on the computer, at least in part by causing the backup storage system to begin providing the storage service to the computer.

The disclosed system provides significant advantages over previous technologies. In the disclosed system, user-defined storage management functions can be tailored to detect specific failure conditions based on system environment parameters that indicate both the current state of an active storage system, and the current state of one or more applications that consume external storage from a storage service or services provided by the active storage system. Failure conditions causing a failover may accordingly be based on the current state of one or more of the applications, the current state of the active storage system, or a combination of the two. The disclosed system allows user-defined functions to define failure conditions in ways that take into consideration both the current state of storage consumer applications and the current state of the active storage system.

The disclosed system also enables user-defined storage management functions to support improved application specific handling of failover conditions. Applications that consume storage from the storage service can accordingly be informed of and prepare for the failover prior to the failover operation being performed (e.g. suspend storage operations), and make adjustments to use the new active storage system after the failover operation is performed (e.g. resume storage operations).

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
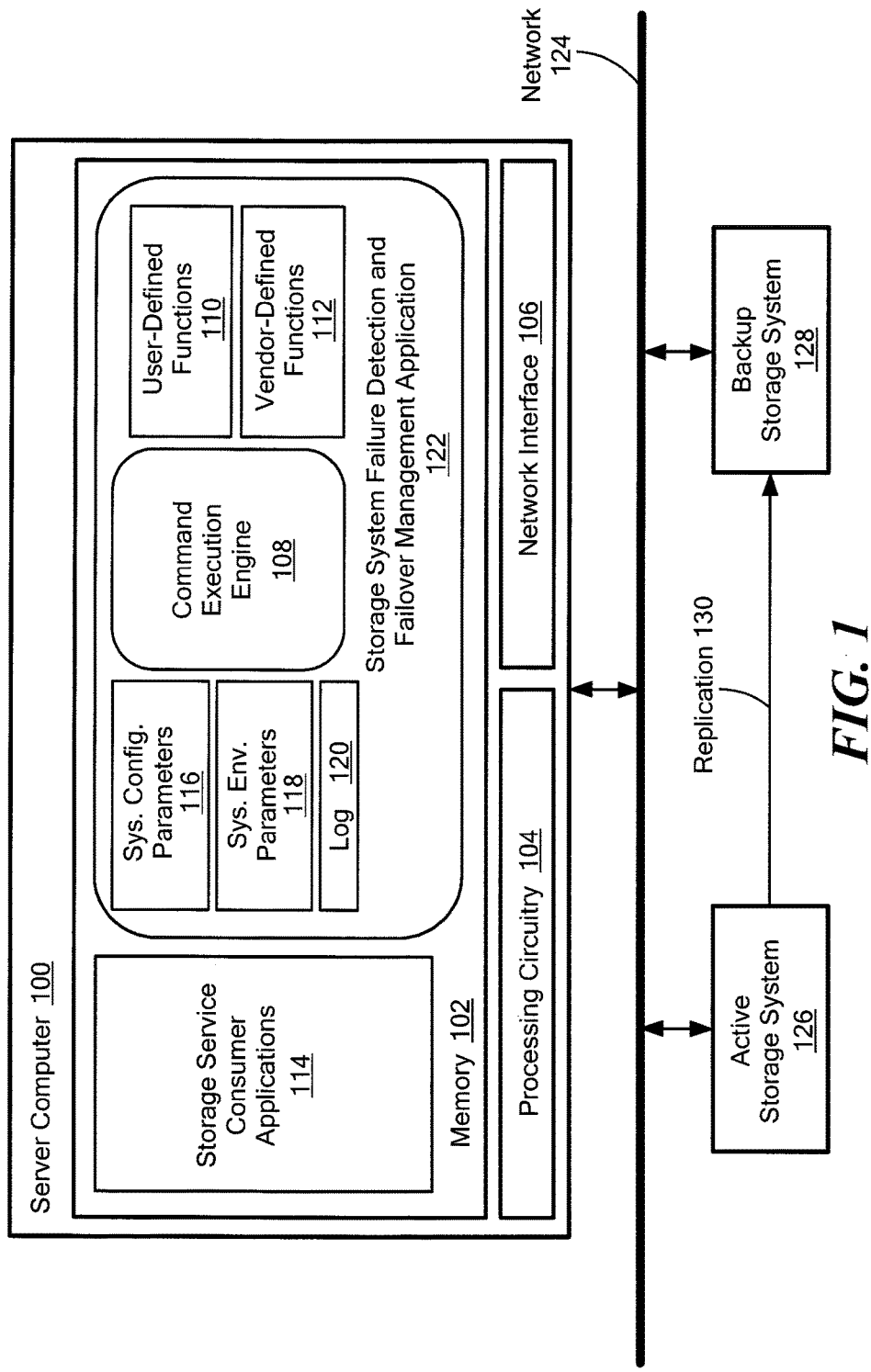
FIG. 1 is a block diagram showing an execution environment including components of an illustrative embodiment of the disclosed system.

As shown in FIG. 1, in an execution environment including components of an illustrative embodiment, a Server Computer 100, Active Storage System 126, and Backup Storage System 128 are communicably coupled together by way of Network 124. Server Computer 100, Active Storage System 126, and Backup Storage System 128 may be communicably coupled through any specific type of communication network and/or computer network that allow computers to exchange data, and accordingly Network 124 may include or consist of a combination of one or more Local Area Networks (LANs), Storage Area Networks (SANs), Wireless Local Area Networks (WLANs), Wide Area Networks (WANs), e.g. the Internet, and/or any other specific type of network.

The Server Computer 100 includes a Network Interface 106, Processing Circuitry 104, and Memory 102. Network Interface 106 may, for example, include or consist of one or more network interface cards (NICs) or the like. Processing Circuitry 104 may, for example, include or consist of one or more microprocessors or the like. Memory 102 may, for example, include or consist of any specific type of volatile or non-volatile semiconductor memory or the like that is operable to store programs (sequences of instructions) and/or data (e.g. program state information) for use in the Server Computer 100.

In the Server Computer 100 in the illustrative embodiment of FIG. 1, the Memory 102 stores program code for execution on the Processing Circuitry 104, including the Storage System Failure Detection and Failover Management Application 122, and Storage Service Consumer Applications 114. The Storage Service Consumer Applications 114 include the specific applications for a given user that consume external storage resources through one or more storage services provided by Active Storage System 126 (or by Backup Storage System 128 in the event of a failover operation). For example, Storage Service Consumer Applications 114 may include electronic mail server, database application, virtual machine server, and/or other application program code that consumes either file and/or block-based storage services from Active Storage System 126, and/or from Backup Storage System 128 in the event of a failover.

The Storage System Failure Detection and Failover Management Application 122 includes Command Execution Engine 108, User-Defined Storage System Management Functions 110, and Vendor-Defined Defined Storage System Management Functions 112. The Memory 102 further stores data generated by and/or used during the execution of the server program code, including System Configuration Parameters 116, System Environment Parameters 118, and Log 120.

The Vendor-Defined Storage System Management Functions 112 may consist of or include storage system management functions, modules, routines or tools obtained from the vendor from which Active Storage System 126 and/or Backup Storage System 128 are purchased. For example, Vendor-Defined Storage System Management Functions 112 may include functions or routines that are designed and/or developed by the vendor to operate with Active Storage System 126 and/or Backup Storage System 128. The Vendor-Defined Storage System Management Functions 112 accordingly are operable to connect to and communicate with Active Storage System 126 and/or Backup Storage System 128, e.g. using a secure channel based on the secure shell (SSH) network protocol, a proprietary protocol, or some other mechanism.

The User-Defined Storage System Management Functions 110 may consist of or include storage system management functions, modules, routines or tools designed, configured and/or developed by or on behalf of a customer that purchases, leases, or otherwise obtains the Active Storage System 128 and/or Backup Storage System 128 from the vendor. The User-Defined Storage System Management Functions 110 are accordingly designed, configured and/or developed to operate with the specific Storage Service Consumer Applications 114 that are used by that customer. For example, the User-Defined Storage System Management Functions 110 may be embodied to include specific failure detection and/or failover processing functions tailored for the needs of the specific Storage Service Consumer Applications 114 of a given customer. Additionally, User-Defined Storage System Management Functions 110 are designed, developed and/or configured to connect to and communicate with individual ones of Storage Service Consumer Applications 114 of a given customer, e.g. using a secure channel based on the secure shell (SSH) network protocol, a proprietary protocol, or some other mechanism. Alternatively, the Command Execution Engine 108 may connect to and communicate with one or more of the Storage Service Consumer Applications 114 on behalf of one or more of the User-Defined Storage System Management Functions 110.

The Active Storage System 126 and Backup Storage System 128 may each be embodied to include at least one processor and program storage, such as memory and/or another computer readable medium, for storing program code executable on the processor, and for storing data operated on by such program code. Each of Active Storage System 126 and Backup Storage System 128 may further include one or more input/output devices and/or interfaces, such as data communication and/or peripheral devices and/or interfaces. The program code on each of Active Storage System 126 and Backup Storage System 128 includes software or firmware operable to provide one or more storage services to Server Computer 100. In another embodiment, the Active Storage System 126 and Backup Storage System 128 may be embodied in whole or in part as storage appliances, such as Network Attached Storage (NAS) appliances, i.e. specialized devices having integrated software, firmware, and/or hardware designed specifically for storing and serving files and/or blocks of data storage as needed to support one or more specific storage services. Each of Active Storage System 126 and Backup Storage System 128 may further include various specific kinds of data storage mechanisms, including but not limited to one or more non-volatile storage devices, such as magnetic disk drives, electronic flash drives, and/or optical drives.

During operation of the components shown in FIG. 1, System Configuration Parameters 116 are used to configure the various components of the system. Active Storage System 126 initially provides one or more storage services to Server Computer 100. The external storage resources provided by Active Storage System 126 to Server Computer 100 are consumed by one or more applications executing in whole or in part on Server Computer 100, shown as Storage Service Consumer Applications 114. The storage service or services provided by Active Storage System 126 may, for example, include or consist of any specific type of storage service that provides units of external storage to Server Computer 100 for use by Storage Service Consumer Applications 114. For example, Active Storage System 126 may provide one or more file-based storage services that provide external storage of files for one or more of the Storage Service Consumer Applications 114, and allow the externally stored files to be accessed by Storage Service Consumer Applications 114 as if they were located on the Server Computer 100's local storage. Such file-based storage services may be based on the Network File System (NFS) protocol, the Server Message Block (SMB) or Common Internet File System (CIFS) application-layer network protocol, the Apple Filing Protocol (AFP), or any other appropriate protocol.

Alternatively, Active Storage System 126 may provide one or more block-based storage services to Server Computer 100. Block-based storage service or services provide external storage in the form of blocks served by Active Storage System 126 from disk storage devices within or connected to Active Storage System 126. For example, Active Storage System 126 may provide one or more block-based storage services employing the Internet Small Computer System Interface (iSCSI), allowing the Storage Service Consumer Applications 114 to access external storage from the Active Storage System 126 as if it were from a locally attached disk. Such block-based storage services may also use Fibre Channel (FC) network technology, and/or the Serial Attached SCSI (SAS) protocol or the like in the context of Direct Attached Storage (DAS).

Further during operation of the components shown in FIG. 1, Backup Storage System 128 maintains a duplicate copy of the user data stored by Active Storage System 126, while Active Storage System 126 provides the storage service(s) to the Server Computer 100. This process is known as data "replication", and is shown in FIG. 1 as Replication 130. Replication 130 may be embodied using any appropriate conventional replication technique or mechanism. Accordingly, by way of Replication 130, Backup Storage System 128 is continuously ready to quickly begin providing the storage service or services being provided by Active Storage System 126 to Server Computer 100, e.g. in the event that Active Storage System 126 experiences a failure. The process of causing Backup Storage System 128 to begin providing the storage service provided by Active Storage System 126, using the replicated data stored on Backup Storage System 128, is known as a failover operation. During a failover operation from Active Storage System 126 to Backup Storage System 128, the storage service or services previously provided by Active Storage System 126 become provided by Backup Storage System 128, thus making Backup Storage System 128 the new active storage system.

Further during operation of the components shown in FIG. 1, the Command Execution Engine 108 loads the User Defined Storage Management Functions 110 and the Vendor-Defined Storage Management Functions 112 into Memory 102 such that Command Execution Engine 108 can execute User-Defined Storage System Management Functions 110 and Vendor-Defined Storage System Management Functions 112. The User-Defined Storage System Management Functions 110 are configured to communicate with the Storage Service Consumer Applications 114, for example by way of one or more Secure Shell (SSH) channels established with the Storage Service Consumer Applications 114. The User-Defined Storage System Management Functions 110 also monitor a set of storage system state parameters that indicate a current state of the active storage system. The storage system state parameters are stored within the System Environment Parameters 118.

The Command Execution Engine 108 also executes the Vendor-Defined Storage System Management Functions 112 on the Server Computer 100. The Vendor-Defined Storage System Management Functions 112 are configured to communicate with the Active Storage System 126 and Backup Storage System 128, and to maintain the storage system state parameters by storing a current state of the Active Storage System 126 into the System Environment Parameters 118. By loading and executing both the User-Defined Storage System Management Functions 110, and the Vendor-Defined Storage System Management Functions 112, the Command Execution Engine 108 enables the User-Defined Storage System Management Functions 110 to call the Vendor-Defined Storage System Management Functions 112, and also enables the Vendor-Defined Storage System Management Functions 112 to call the User-Defined Storage System Management Functions 110.

For example, the Command Execution Engine 108 may be embodied as an interpreter program that directly executes, i.e. performs, commands or instructions written in a programming or scripting language, without previously compiling them into a machine language program. For example, the Command Execution Engine 108 may include a command line interface that processes commands consisting of lines of text contained in functions embodied as scripts. In such an embodiment, the User-Defined Storage System Management Functions 110 and the Vendor-Defined Storage System Management Functions 112 may be embodied as scripts of commands that are loaded and executed by the Command Execution Engine 108.

The Command Execution Engine 108 may be embodied to execute one or more of the User-Defined Storage System Management Functions 110 within a first set of execution threads, and/or one or more of the Vendor-Defined Storage System Management Functions 112 within a second set of execution threads, in a shared execution context that includes both the User-Defined Storage System Management Functions 110, and the Vendor-Defined Storage System Management Functions 112.

The disclosed system may detect storage failure conditions responsive to the execution of one or more of both User-Defined Storage System Management Functions 110 and Vendor-Defined Storage System Management Functions 112, and also processes the detected storage failure conditions through the execution of one or more of User-Defined Storage System Management Functions 110 and Vendor-Defined Storage System Management Functions 112, in order to provide failure detection and failover management with regard to the Active Storage System 126, and/or Storage Service Consumer Applications 114. Log 120 may be used to store various logging data, such as a record of the execution of User-Defined Storage Management Functions 110 and Vendor-Defined Storage Management Functions 112 by the Command Execution Engine 108.

In one embodiment of the disclosed system, one of the Vendor-Defined Storage System Management Functions 112 detects a storage failure condition by first detecting that the Active Storage System 126 has failed. Processing the detected storage failure condition includes, in response to the vendor-defined storage management function detecting that the active storage system has failed, modifying, by a vendor-defined storage system management function, the storage system state parameters in System Environment Parameters 118 to indicate that the Active Storage System 126 has failed. One of the User-Defined Storage System Management Functions 110 reads the storage system state parameters from the System Environment Parameters 118, and, responsive to the storage system state parameters indicating that Active Storage System 126 has failed, sends an indication that Active Storage System 126 has failed to at least one of the Storage Service Consumer Applications 114.

In another aspect of the disclosed system, processing the detected storage failure conditions further includes, in response to detecting that Active Storage System 126 has failed, one of the Vendor-Defined Storage System Management Functions 112 triggering a failover operation causing Backup Storage System 128 to become the new active storage system. In response to completion of the failover operation, a vendor-defined storage system management function modifies the storage system state parameters in System Environment Parameters 118 to indicate that Backup Storage System 128 is the new active storage system, and calls another one of the User-Defined Storage System Management Functions 110. Calling the user-defined storage system management function causes the user-defined storage system management function to read the storage system state parameters in System Environment Parameters 118, and, responsive to the storage system state parameters indicating that Backup Storage System 128 is the new active storage system, send an indication to at least one of the Storage Service Consumer Applications 114 that the new active storage system is available to provide the storage service to the application.

In another embodiment, the detection of storage failure conditions by the disclosed system includes detecting, by one of the User-Defined Storage System Management Functions 110, that one of the Storage Service Consumer Applications 114 has experienced a storage service failure. In this embodiment, processing of the detected storage failure conditions includes, in response to detecting that the application has experienced a storage service failure, a user-defined storage system management function calling one of the Vendor-Defined Storage System Management Functions 112. Calling the vendor-defined storage system management function causes the vendor-defined storage system management function to check the operational status of the Active Storage System 126. In response to the Active Storage System 126 indicating a temporary failure, a vendor-defined storage system management function modifies the storage system state parameters in System Environment Parameters 118 to indicate that the Active Storage System 126 has experienced a temporary failure. A user-defined storage system management function then reads the storage system state parameters in System Environment Parameters 118. In response to the storage system state parameters indicating that the Active Storage System 126 has experienced a temporary failure, a user-defined storage system management function communicates with the application in the Storage Service Consumer Applications 114 that originally experienced the storage service failure, in order to indicate to the application that the Active Storage System 126 has experienced a temporary failure. The user-defined storage management function may further communicate other aspects of the temporary failure to the application. For example, the user-defined storage management function may indicate that the temporary failure involves the Active Storage System 126 being able to process read operations, but not write operations. The application may then adjust its operations according to the temporary failure of Active Storage System 126. For example, if Active Storage System 126 is temporarily unable to process write operations, the application may queue write operations until the Active Storage System 126 has recovered from the temporary failure, at which time the application may issue the queued write operations to Active Storage System 126.

The vendor-defined storage system management function then subsequently re-checks the operational status of the Active Storage System 126. In response to the Active Storage System 126 indicating that the Active Storage System 126 has recovered from the temporary failure, a vendor-defined storage system management function modifies the storage system state parameters in System Environment Parameters 118 to indicate that the Active Storage System 126 has recovered from the temporary failure. A user-defined storage system management function then reads the storage system state parameters. In response to the storage system state parameters indicating that Active Storage System 126 has recovered from the temporary failure, a user-defined storage system management function sends an indication to the application that the Active Storage System 126 has recovered from the temporary failure.

In another embodiment, detecting storage failure conditions by the disclosed system includes detecting, by one of the User-Defined Storage System Management Functions 110, that one of the Storage Service Consumer Applications 114 has experienced a storage service failure. In this embodiment, processing the detected storage failure conditions includes, in response to detecting that the application has experienced a storage service failure, one of the user-defined storage system management functions calling one of the Vendor-Defined Storage System Management Functions 112. A vendor-defined storage system management function checks the operational status of Active Storage System 126. In response to Active Storage System 126 indicating that Active Storage System 126 has permanently failed, a vendor-defined storage management function calls another one of the User-Defined Storage System Management Functions 110. Calling the second user-defined storage system management function causes the second user-defined storage system management function to send an indication to the application that experienced the storage service failure that the Active Storage System 126 has permanently failed.

In another embodiment, detecting storage failure conditions by the disclosed system includes detecting, by one of the User-Defined Storage System Management Functions 110, that one of the Storage Service Consumer Applications 114 has experienced a critical failure, such as a performance condition or the like that requires a failover operation from Active Storage System 126 to Backup Storage System 128. Such a critical failure may be responsive to a determination by the application that storage service performance is not meeting the application's performance requirements, and that storage service performance may be improved by causing a failover operation to cause the storage service to be provided by the Backup Storage System 128. For example, in a configuration in which the Backup Storage System 128 is located significantly closer to the server computer than the Active Storage System 126, the performance characteristics of the storage service may be improved by causing a failover from the Active Storage system 126 to the Backup Storage System 128, due to lower propagation delays over the network between the Backup Storage System 128 and the server computer. In another example, the application may issue a critical failure in order to force a failover operation to test the ability of the Backup Storage System 128 to provide the storage service.

In this embodiment, processing the detected storage failure condition by the disclosed system includes, in response to detecting that the application has experienced the critical failure, a user-defined storage system management function calling one of the Vendor-Defined Storage System Management Functions 112. The vendor-defined storage system management function triggers a failover operation causing Backup Storage System 128 to become the new active storage system, without checking the operational status of the Active Storage System 126. Accordingly, the failover operation is performed regardless of the current operational status of Active Storage System 126, and may be performed even when Active Storage System 126 is fully operational and has not experienced a failure.

Figure 2:
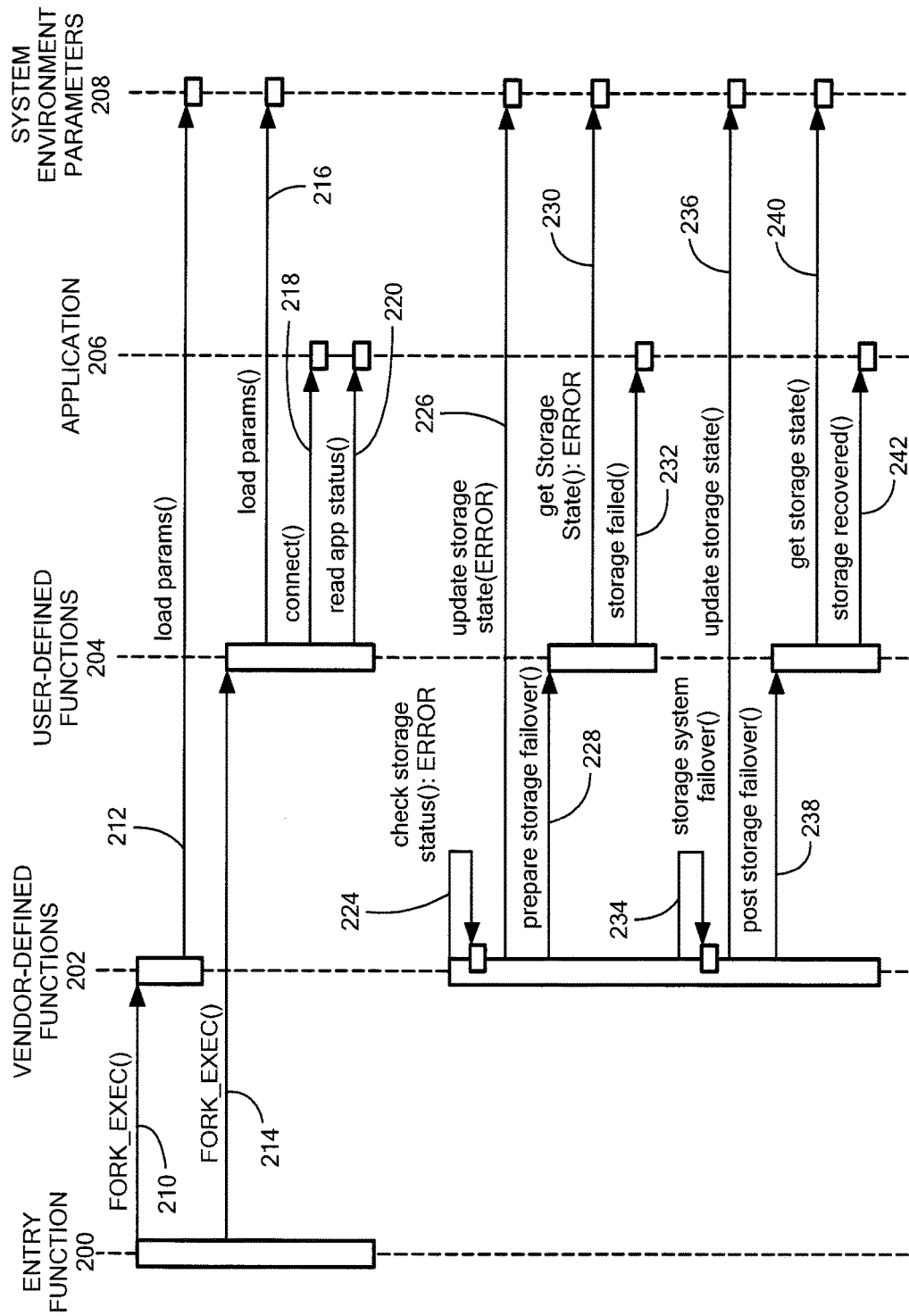
FIG. 2 is a sequence diagram showing a first example of operation of the disclosed system.

FIG. 2 is a sequence diagram showing a first example of operation of the disclosed system. The sequence diagram of FIG. 2 illustrates a sequence of interactions over time between an Entry Function 200, one or more Vendor-Defined Functions 202 (e.g. one or more of the Vendor-Defined Storage System Management Functions 110 in FIG. 1), one or more User-Defined Functions 204 (e.g. one or more of the User-Defined Storage System Management Functions 110 in FIG. 1), an Application 206 (e.g. one of the Storage Service Consumer Applications 114 in FIG. 1), and System Environment Parameters 208 (e.g. System Environment Parameters 118 in FIG. 1). At 210, the Entry Function 200 creates (e.g. through a FORK_EXEC( ) function) an execution thread for Vendor-Defined Functions 202, e.g. in order for one of the Vendor-Defined Functions 202 to detect a storage system failure. At 212 one of the Vendor-Defined Functions 202 (e.g. a "load_params( )" function) reads one or more parameters from System Environment Parameters 208. At 214 the Entry Function 200 creates (e.g. through the FORK_EXEC( ) function) an execution thread for User-Defined Functions 204, e.g. in order for one of the User-Defined Functions 204 to monitor the status of Application 206. At 216 one of User-Defined Functions 204 (e.g. a "load_params( )" function) reads one or more parameters from System Environment Parameters 208. At 218 one of User-Defined Functions 204 (e.g. a "connect( )" function) establishes a communication connection with Application 206, such as, for example, a secure communication channel based on the secure shell (SSH) network protocol. At 220 one of User-Defined Functions 204 (e.g. a "read_app_status( )" function) reads a current operational status of Application 206.

At 224 a failure in the active storage system is detected by one of Vendor-Defined Functions 202 (e.g. a "check_storage_status( )" function returns "ERROR"). At 226 one of Vendor-Defined Functions 202 (e.g. an "update_storage_state(ERROR)" function) updates the storage system state in System Environment Parameters 208 to reflect the detected failure. At 228 one of Vendor-Defined Functions 202 (e.g. an "prepare_storage_failover( )" function) calls one of the User-Defined Functions 204 at 230 (e.g. a "get_storage_state( ): ERROR" function) that reads the storage system state in System Environment Parameters 208, and determines that an error has occurred in the active storage system. At 232, one of the User-Defined Functions 204 (e.g. a "storage_failed( )" function) informs Application 206 that the active storage system has failed, and that accordingly a failover operation is about to be performed. At 234, one of the Vendor-Defined Functions 202 (e.g. a "storage_system_failover( )" function) triggers the failover from the active storage system to a backup storage system. After the failover operation is complete, and the former backup storage system is operational as the new active storage system, at 236 one of the Vendor-Defined Functions 202 (e.g. an "update_storage_state( )" function) updates the storage system status in the System Environment Parameters 208 to indicate that the failover is complete, and at 238 one of the Vendor-Defined Functions 202 (e.g. a "post_storage_failover( )" function) calls one of User-Defined Functions 204 (e.g. a "get_storage_state( )" function), which at 240 retrieves the updated storage system status parameters from the System Environment Parameters 208. In response to the storage system status parameters indicating that the failover operation is complete, at 242 a user-defined function (e.g. a "storage_recovered( )" function) indicates to Application 206 that the storage system has recovered.

Figure 3:
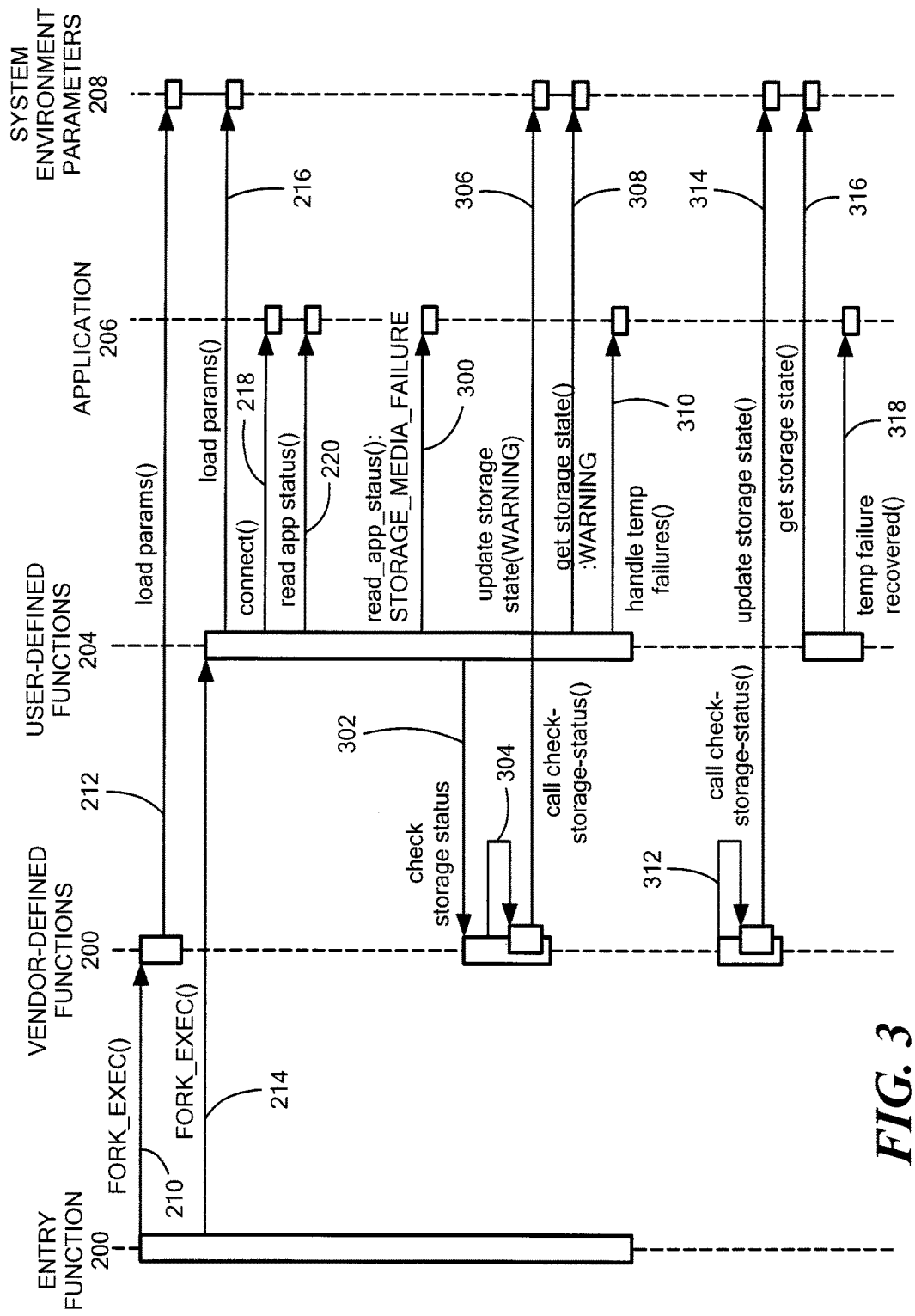
FIG. 3 is a sequence diagram showing a second example of operation of the disclosed system.

FIG. 3 is a sequence diagram showing a second example of operation of the disclosed system. Like the sequence diagram of FIG. 2, FIG. 3 illustrates a sequence of interactions over time between an Entry Function 200, one or more Vendor-Defined Functions 202 (e.g. one or more of the Vendor-Defined Storage System Management Functions 110 in FIG. 1), one or more User-Defined Functions 204 (e.g. one or more of the User-Defined Storage System Management Functions 110 in FIG. 1), an Application 206 (e.g. one of the Storage Service Consumer Applications 114 in FIG. 1), and System Environment Parameters 208 (e.g. System Environment Parameters 118 in FIG. 1). Events 210, 212, 214, 216, 218, 220 are the same as FIG. 2. At 300, one of the User Defined Functions 204 (e.g. a "read_app_status( )" function) reads the status of Application 206 (e.g. "STORAGE_MEDIA_FAILURE"), and detects that Application 206 has experienced a storage failure, e.g. a storage media failure. At 302, the user defined function (e.g. a "check_storage_status( )" function) calls one of Vendor-Defined Functions 202, indicating that the vendor-defined functions should check the status of the active storage system. For example, at 304 one of Vendor-Defined Functions 202 (e.g. a "check_storage_status( )" function) checks the status of the active storage system, and determines that the active storage system has experienced a temporary failure. At 306 a vendor-defined function (e.g. an "update_storage_state (WARNING)" function) then updates the storage system state parameters in System Environment Parameters 208 to indicate that the active storage system has experienced a temporary failure. Such an indication may, for example, consist of a warning status (e.g. "WARNING") or the like. At 308, one of the User-Defined Functions 204 (e.g. a "get_storage_state( )" function) reads the storage system state parameters from the System Environment Parameters 208, including the warning status indicating that the active storage system has experienced a temporary failure. In response to the indication that the active storage system has experienced a temporary failure, at 310 a user-defined function (e.g. a "handle_temp_failures( )" function) communicates with Application 206, indicating that the active storage system has experienced a temporary failure. The Application 206 may then make any internal adjustments needed to handle the temporary failure, e.g. queue write and/or read storage operations until after the temporary failure has been resolved.

After the active storage system has recovered from its temporary failure, at 312, one of the Vendor-Defined Functions 202 (e.g. a "check_storage_status( )" function) checks the status of the active storage system, and learns that the active storage system has recovered from it temporary failure. In response to determining that the active storage system has recovered, at 314 one of the Vendor-Defined Functions 202 (e.g. an "update_storage_state( )" function) updates the storage system status parameters in the System Environment Parameters 208 to indicate that the active storage system has recovered. At 316, one of the User-Defined Functions 204 (e.g. a "get_storage_state( )" function) retrieves the storage state parameters from the System Environment Parameters 208. In response to the storage state parameters indicating that the active storage system has recovered, at 318 a user-defined function (e.g. a "temp_failure_recovered( )" function) indicates to the Application 206 that the active storage system has recovered. The Application 206 may then perform any internal recovery operations related to the temporary failure, e.g. issue any write and/or read operations queued during the temporary failure.

Figure 4:
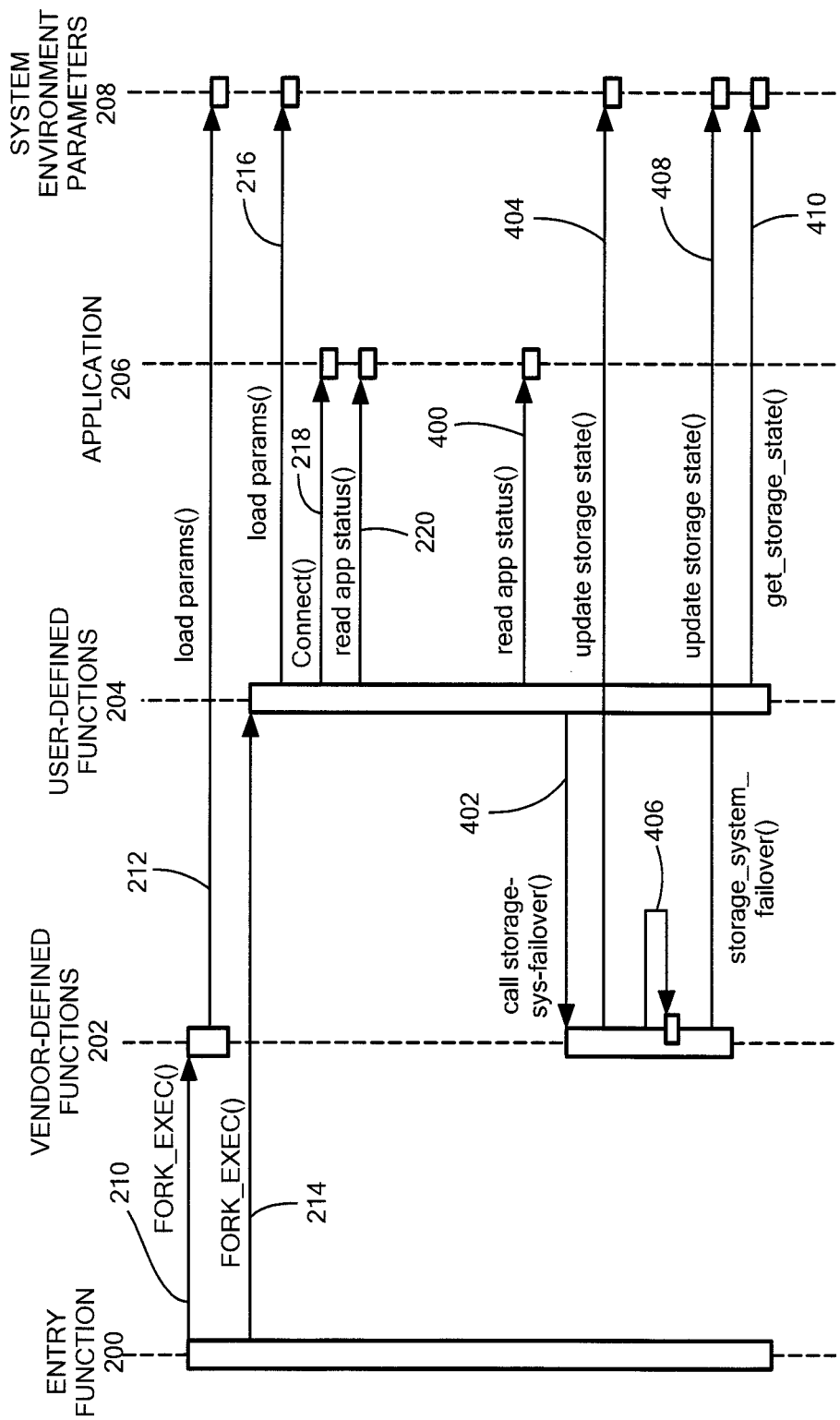
FIG. 4 is a sequence diagram showing a third example of operation of the disclosed system.

FIG. 4 is a sequence diagram showing a third example of operation of the disclosed system. Like the sequence diagrams of FIGS. 2 and 3, FIG. 4 illustrates a sequence of interactions over time between an Entry Function 200, one or more Vendor-Defined Functions 202 (e.g. one or more of the Vendor-Defined Storage System Management Functions 110 in FIG. 1), one or more User-Defined Functions 204 (e.g. one or more of the User-Defined Storage System Management Functions 110 in FIG. 1), an Application 206 (e.g. one of the Storage Service Consumer Applications 114 in FIG. 1), and System Environment Parameters 208 (e.g. System Environment Parameters 118 in FIG. 1). Events 210, 212, 214, 216, 218, 220 are the same as FIG. 2. At 400, one of the User-Defined Functions 204 (e.g. a "read_app_status( )" function) reads or otherwise obtains the status of Application 206, and detects that Application 206 has experienced a critical failure that requires a failover operation. For example, Application 206 may experience a critical failure in response to storage performance being below a predetermined threshold performance level when the storage service is provided from Active Storage System 126. Under such circumstances, when Application 206 experiences the critical failure, a failover operation may be required to improve storage service performance experienced by Application 206. In certain cases, moving the storage service used by Application 206 from the current active storage system to a backup storage system may result in improved storage performance. For example, a failover operation may result in improved storage performance in the case where the current active storage system is located at a greater geographic distance from Application 206 than the backup storage system. In such a situation, a failover operation causing the storage service used by Application 206 to be moved from the current active storage system to the backup storage system would result in lower network latency for the storage service to Application 206, and thereby improve storage service performance experienced by Application 206.

At 402, one of the User-Defined Functions 204 calls one of the Vendor-Defined Functions 202 (e.g. a "storage-sysfailover( )" function) in order to cause a failover from the active storage system to the backup storage system. As a result, at 404 one of the Vendor Defined Functions 202 (e.g. an "update_storage_status( )" function) updates the storage system status parameters in the System Environment Parameters 208 to indicate that a failover operation is about to be performed, and at 406 one of the Vendor Defined Functions 202 (e.g. a "storage_system_failover( )" function) initiates a failover operation causing the storage service to be moved from the active storage system to the backup storage system. Subsequently, at 408, one of the Vendor Defined Functions 202 (e.g. an "update_storage_state( )" function) updates the storage system status parameters in the System Environment Parameters 208 to indicate that the failover operation has completed. At 410 one of the User-Defined Functions 204 (e.g. a "get_storage_state( )" function) reads the storage system status parameters from the System Environment Parameters 208. Subsequently, in response to the storage system status parameters indicating that the failover operation has completed, another of the User-Defined Functions 204 may communicate to Application 206, indicating that the failover operation has completed and that the storage service is now available from the new active storage system.

Figure 5:
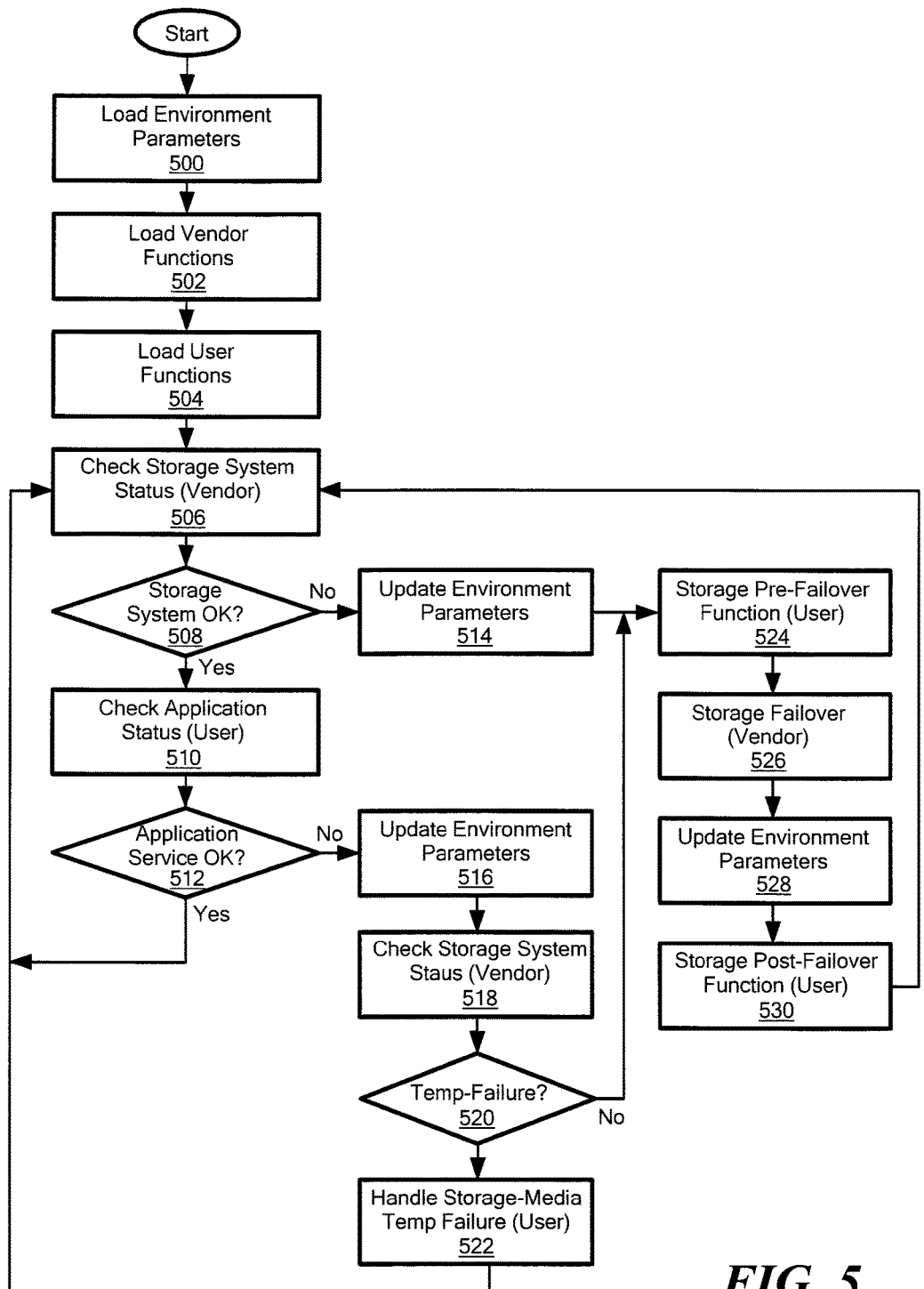
FIG. 5 is a flow chart showing an example of steps performed in an illustrative embodiment of the disclosed system.

FIG. 5 is a flow chart showing an example of steps performed in an illustrative embodiment of the disclosed system. The steps of FIG. 5 may, for example, be performed by the Command Execution Engine 108 shown in FIG. 1 when loading and executing user-defined storage system management functions and vendor-defined storage system management functions. At step 500, the command execution engine loads system environment parameters (e.g. System Environment Parameters 118 in FIG. 1). At step 502, the command execution engine loads a number of vendor-defined storage system management functions (e.g. Vendor-Defined Functions 112 in FIG. 1). At step 504, the command execution engine loads a number of user-defined storage system management functions (e.g. User-Defined Storage System Management Functions 110 in FIG. 1). At step 506, the command execution engine executes one of the vendor-defined storage system management functions that checks the status of the active storage management system. At step 508, a vendor-defined storage system management function determines whether the current status of the active storage system indicates that the active storage system is operating correctly (e.g. whether the status of the application is "OK"). If the active storage system is operating correctly, step 508 is followed by step 510, in which the command execution engine executes one of the user-defined storage system management functions. The user-defined storage system management function executed at step 510 checks the status of one or more applications that consume storage provided through the storage service provided by the active storage system (e.g. one or more of the Storage Service Consumer Applications 114 in FIG. 1). At step 512, the user-defined storage system management function determines whether the current status of the application indicates that the application is operating correctly (e.g. whether the status of the application "OK"). If not, then step 512 is followed by step 516, in which the user-defined storage system management command updates one or more system environment parameters (e.g. one or more of System Environment Parameters 118) to indicate that the application has experienced a failure. Examples of application failures that may be detected at step 516 include without limitation storage media failures experienced by a database application or the like.

Step 516 is followed by step 518, in which the command execution engine executes one of the vendor-defined storage system management functions. The vendor-defined storage system management function executed at step 518 checks the operational status of the active storage system, and at step 520 determines whether the active storage system is experiencing a temporary failure. For example, the active storage system may experience a temporary failure when a local failover is performed within or local to the active storage system. For example, a local failover may occur when a switch is made from providing a storage service using a copy of user data stored on a first storage device or set of storage devices (e.g. a first disk or disks) located within the active storage system, to providing the storage service using a duplicate copy of the user data stored on another storage device or set of storage devices (e.g. a second disk or disks) located within the active storage system. Such a switch between copies of user data may occur in response to the first storage device or set of storage devices having experienced a failure. In general, a temporary failure of the active storage system is a failure that may temporarily interrupt the storage service provided by the active storage system, but that does not require a failover from the active storage system to the backup storage system. For example, a temporary failure of the active storage system may cause write operations to be temporarily stopped, while read operations can continue to be performed without interruption during the temporary failure.

If the active storage system is experiencing a temporary failure, step 520 is followed by step 522, in which the command execution engine executes a user-defined storage system management function that handles temporary failures. The user-defined storage system management function executed at step 522 informs the application that the active storage system has experienced a temporary failure. This enables the application to take steps to handle the temporary failure. For example, in the case where the temporary failure of the active storage management system causes write operations to be suspended during the temporary failure, the application may handle the temporary failure by queuing write operations during the temporary failure, so that the queued write operations can be issued to the active storage system after the active storage system has recovered from the temporary failure.

If at step 508, the vendor-defined storage system management function executed by the command execution engine at step 506 determines that the current status of the active storage system indicates that the active storage system has permanently failed (i.e. has failed in a way that requires a failover operation to the backup storage system), step 508 is followed by step 514, in which the vendor-defined storage system management function updates the storage system status parameters in the system environment parameters (e.g. in System Environment Parameters 118 in FIG. 1) to indicate that the active storage system has experienced a permanent failure, and that a failover operation is to be performed. At step 524, in response to the storage system status parameters indicating that the active storage system has experienced a permanent failure, the command execution engine executes a user-defined storage system management function that performs pre-failover processing including informing the application that a failover operation is about to occur. This enables the application to perform any pre-failover adjustments that may be needed to prepare to use the backup storage system as the new active storage system after the failover operation has completed.

At step 526, the command execution engine executes a vendor-defined storage system management function that triggers a failover operation, causing the backup storage system to begin providing the storage service formerly provided by the active storage system, thus making the backup storage system the new active storage system. After the failover operation has completed, at step 528, the vendor-defined storage system management function updates the storage system status parameters in the system environment parameters to indicate that the failover operation has completed, and the storage service is accordingly again available. At step 530, the command execution engine executes a user-defined function that reads the updated storage system status parameters, and in response to determining that the failover operation has completed, performs post-failover processing, including providing an indication to the application that the failover operation has completed, and the storage service is again available. The application can then resume use of the storage service.

Those skilled in the art will recognize that the disclosed system is significantly more than merely the abstract idea of detecting and processing storage failure conditions. Instead, the disclosed system addresses various specific shortcomings arising in previous technical solutions, including shortcomings arising from the limitations of previous approaches using only vendor-supplied storage management functions. In the disclosed system, user-defined storage management functions can be tailored to detect specific failure conditions based on both the current state of an active storage system, and the current state of one or more applications that consume a storage service or services provided by the active storage system. Failure conditions causing a failover may accordingly be based on the current state of one or more of the applications, the current state of the active storage system, or a combination of the two. The disclosed system also enables user-defined storage management functions to provide application specific handling of failover conditions. Applications that consume the storage service can accordingly be informed of and prepared for a storage system failover operation, e.g. from the active storage system to the backup storage system, prior to the failover operation being performed, and thus be able to make appropriate adjustments and use the new active storage system after the failover operation is performed.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. In particular, while the above description includes a client-server embodiment, the disclosed system is not limited to a client-server configuration, and may alternatively be embodied within a single computer system.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of providing user-defined failure detection and failover management, comprising executing, on at least one processor, the steps of:
   providing, by an active storage system, external storage to at least one application executing on a computer, the external storage provided to the application through a storage service provided by the active storage system to the computer over a network, the active storage system obtained by a customer from a storage system vendor,
   loading, into a memory of the computer
      i) a plurality of user-defined storage system management functions, wherein the user-defined storage system management functions were developed by the customer of the storage system vendor, wherein the user-defined storage system management functions are communicable with the application executing on the computer and operable to monitor storage system state parameters indicating a current state of the active storage system, and wherein the storage system state parameters are stored in a set of system environment parameters located in the memory of the computer;
      ii) a plurality of vendor-defined storage system management functions, wherein the vendor-defined storage system management functions were obtained by the customer from the storage system vendor, wherein the vendor-defined storage system management functions are communicable with the active storage system, and wherein the vendor-defined storage system management functions are operable to maintain the storage system state parameters by storing a current state of the active storage system into the storage system state parameters; and
   detecting and processing a plurality of storage failure conditions by executing the user-defined storage system management functions and the vendor-defined storage system management functions on the computer to provide user-defined failure detection and failover management.

2. The method of claim 1, wherein detecting and processing the storage failure conditions includes:
   detecting, by a first one of the vendor-defined storage system management functions, that the active storage system has failed;
   in response to detecting that the active storage system has failed, a second one of the vendor-defined storage system management functions modifying the storage system state parameters to indicate that the active storage system has failed;

reading, by a first one of the user-defined storage system management functions, the storage system state parameters, and responsive to the storage system state parameters indicating that the active storage system has failed, a second one of the user-defined storage system management functions sending an indication to the application that the active storage system has failed.

3. The method of claim 2, wherein detecting and processing the storage failure conditions further includes:

in response to detecting that the active storage system has failed, a third one of the vendor-defined storage system management function triggering a failover operation causing a backup storage system to replace the active storage system in providing the external storage to the application executing on the computer, at least in part by causing the backup storage system to begin providing the storage service from the backup storage system to the computer;

in response to completion of the failover operation, a fourth one of the vendor-defined storage system management functions modifying the storage system state parameters to indicate that the backup storage system is the new active storage system, and in response to the storage system state parameters indicating that the backup storage system is the new active storage system, a third one of the user-defined storage system management functions sending an indication to the application that the backup storage system has begun providing the storage service to the computer.

4. The method of claim 1, wherein detecting and processing the storage failure conditions includes:

detecting, by one of the user-defined storage system management functions, that the application has experienced a storage service failure;

checking, by one of the vendor-defined storage system management functions, the operational status of the active storage system, and modifying the storage system state parameters to indicate that the active storage system has experienced a temporary failure; and sending, by a second one of the user-defined storage system management functions, in response to the storage system state parameters indicating that the active storage system has experienced a temporary failure, an indication to the application that the active storage system has experienced a temporary failure.

5. The method of claim 4, wherein detecting and processing the storage failure conditions further includes:

re-checking the operational status of the active storage system by the vendor-defined storage management function, and in response to the active storage system indicating that the active storage system has recovered from the temporary failure, modifying the storage system state parameters to indicate that the active storage system has recovered from the temporary failure; and responsive to the storage system state parameters indicating that the active storage system has recovered from the temporary failure, a third one of the user-defined storage system management functions indicating to the application that the active storage system has recovered from the temporary failure.

6. The method of claim 1, wherein detecting and processing the storage failure conditions includes detecting, by one of the user-defined storage system management functions, that the application has experienced a storage service failure;

one of the vendor-defined storage system management functions determining that the active storage system has experienced a permanent failure; and a second one of the user-defined storage system management functions sending an indication to the application that the active storage system has permanently failed.

7. The method of claim 1, wherein detecting and processing the storage failure conditions includes:

detecting, by one of the user-defined storage system management functions, that the application has experienced a critical failure; and in response to the user-defined function detecting that the application has experienced a critical failure, one of the vendor-defined storage system management functions causing the vendor-defined storage system management function to trigger, without checking the operational status of the active storage system, a failover operation causing a backup storage system to replace the active storage system in providing the external storage to the at least one application executing on the computer, at least in part by causing the backup storage system to begin providing the storage service from the backup storage system to the computer.

8. The method of claim 1, further comprising:

wherein the user-defined storage system management functions comprise a plurality of scripts;

wherein detecting and processing the storage failure conditions includes executing the user-defined storage system management functions using a script interpreter; and wherein loading the user-defined storage system management functions and the vendor-defined storage system management functions into the memory of the computer enables the user-defined storage system management functions to call the vendor-defined storage system management functions.

9. A computer for providing user-defined failure detection and failover management, wherein the computer is communicable with an active storage system obtained by a customer from a storage system vendor, and the active storage system provides external storage to at least one application executing on the computer, the external storage provided to the application through a storage service provided by the active storage system to the computer over a network, comprising:

at least one hardware processor;

a memory having program code stored thereon for execution on the processor, the program code including program code for loading, into a memory of the computer i) a plurality of user-defined storage system management functions, wherein the user-defined storage system management functions were developed by the customer of the storage system vendor, wherein the user-defined storage system management functions are communicable with the application executing on the computer and operable to monitor storage system state parameters indicating a current state of the active storage system, and wherein the storage system state parameters are stored in a set of system environment parameters located in the memory of the computer; and ii) a plurality of vendor-defined storage system management functions, wherein the vendor-defined storage system management functions were obtained by the customer from the storage system vendor, wherein the vendor-defined storage system management functions are communicable with the active storage system, and wherein the vendor-defined storage system management functions are operable to maintain the storage system state parameters by storing a current state of the active storage system into the storage system state parameters; and program code for detecting and processing a plurality of storage failure conditions by executing the user-defined storage system management functions and the vendor-defined storage system management functions on the computer to provide user-defined failure detection and failover management.

10. The system of claim 9, wherein the program code for detecting and processing the storage failure conditions includes program code for:

executing a first one of the vendor-defined storage system management functions to detect that the active storage system has failed;

executing a second one of the vendor-defined storage system management functions, in response to detecting that the active storage system has failed, to modify the storage system state parameters to indicate that the active storage system has failed;

executing a first one of the user-defined storage system management functions to read the storage system state parameters, and executing a second one of the user-defined storage system management functions, responsive to the storage system state parameters indicating that the active storage system has failed, to send an indication that the active storage system has failed to the application.

11. The system of claim 10, wherein the program code for detecting and processing the storage failure conditions further includes program code for:

executing a third one of the vendor-defined storage system management functions, in response to detecting that the active storage system has failed, to trigger a failover operation causing a backup storage system to replace the active storage system in providing the external storage to the application executing on the computer, at least in part by causing the backup storage system to begin providing the storage service from the backup storage system to the computer;

executing a fourth one of the vendor-defined storage system management functions, in response to completion of the failover operation, to modify the storage system state parameters to indicate that the backup storage system is the new active storage system, and executing a third one of the user-defined storage system management functions, in response to the storage system state parameters indicating that the backup storage system is the new active storage system, to send an indication to the application that the backup storage system has begun providing the storage service to the computer.

12. The system of claim 9, wherein the program code for detecting and processing the storage failure conditions includes program code for:

executing one of the user-defined storage system management functions to detect that the application has experienced a storage service failure;

executing one of the vendor-defined storage system management functions to check the operational status of the active storage system, executing a second one of the vendor-defined storage system management functions to modify the storage system state parameters to indicate that the active storage system has experienced a temporary failure; and executing a second one of the user-defined storage system management functions, in response to the storage system state parameters indicating that the active storage system has experienced a temporary failure, to send an indication that the active storage system has experienced a temporary failure to the application.

13. The system of claim 12, wherein the program code for detecting and processing the storage failure conditions further includes program code for:

executing the one of the vendor-defined storage management functions to check the operational status of the active storage system;

in response to the active storage system indicating that the active storage system has recovered from the temporary failure, executing the second one of the vendor-defined storage management functions to modify the storage system state parameters to indicate that the active storage system has recovered from the temporary failure; and responsive to the storage system state parameters indicating that the active storage system has recovered from the temporary failure, executing a third one of the user-defined storage system management functions to indicate to the application that the active storage system has recovered from the temporary failure.

14. The system of claim 9, wherein the program code for detecting and processing the storage failure conditions includes program code for:

executing one of the user-defined storage system management functions to detect that the application has experienced a storage service failure;

executing one of the vendor-defined storage system management functions to determine that the active storage system has experienced a permanent failure; and executing a second one of the user-defined storage system management functions to send an indication to the application that the active storage system has permanently failed.

15. The system of claim 9, wherein the program code for detecting and processing the storage failure conditions includes program code for:

executing one of the user-defined storage system management functions to detect that the application has experienced a critical failure; and executing one of the vendor-defined storage system management functions in response to the user-defined function detecting that the application has experienced a critical failure, to trigger, without checking the operational status of the active storage system, a failover operation causing a backup storage system to replace the active storage system in providing the external storage to the at least one application executing on the computer, at least in part by causing the backup storage system to begin providing the storage service from the backup storage system to the computer.

16. The system of claim 9, further comprising:

wherein the user-defined storage system management functions comprise a plurality of scripts;

wherein the program code for detecting and processing the storage failure conditions includes a script interpreter for executing the user-defined storage system management functions on the computer; and wherein loading the user-defined storage system management functions and the vendor-defined storage system management functions into the memory of the computer enables the user-defined storage system management functions to call the vendor-defined storage system management functions.

17. A non-transitory computer readable medium for providing user-defined failure detection and failover management in a computer, wherein the computer is communicable with an active storage system obtained by a customer from a storage system vendor, wherein the active storage system provides external storage to at least one application executing on the computer, wherein the external storage is provided to the application through a storage service provided by the active storage system to the computer over a network, the non-transitory medium having instructions stored thereon, that when executed on a processor of a computer, perform the steps of:

loading, into a memory of the computer i) a plurality of user-defined storage system management functions, wherein the user-defined storage system management functions were developed by the customer of the storage system vendor, wherein the user-defined storage system management functions are communicable with the application executing on the computer and operable to monitor storage system state parameters indicating a current state of the active storage system, and wherein the storage system state parameters are stored in a set of system environment parameters located in the memory of the computer;

ii) a plurality of vendor-defined storage system management functions, wherein the vendor-defined storage system management functions were obtained by the customer from the storage system vendor, wherein the vendor-defined storage system management functions are communicable with the active storage system, and wherein the vendor-defined storage system management functions are operable to maintain the storage system state parameters by storing a current state of the active storage system into the storage system state parameters; and detecting and processing a plurality of storage failure conditions by executing the user-defined storage system management functions and the vendor-defined storage system management functions on the computer to provide user-defined failure detection and failover management.

* * * * *